United States Patent Office 3,362,523
Patented Jan. 9, 1968

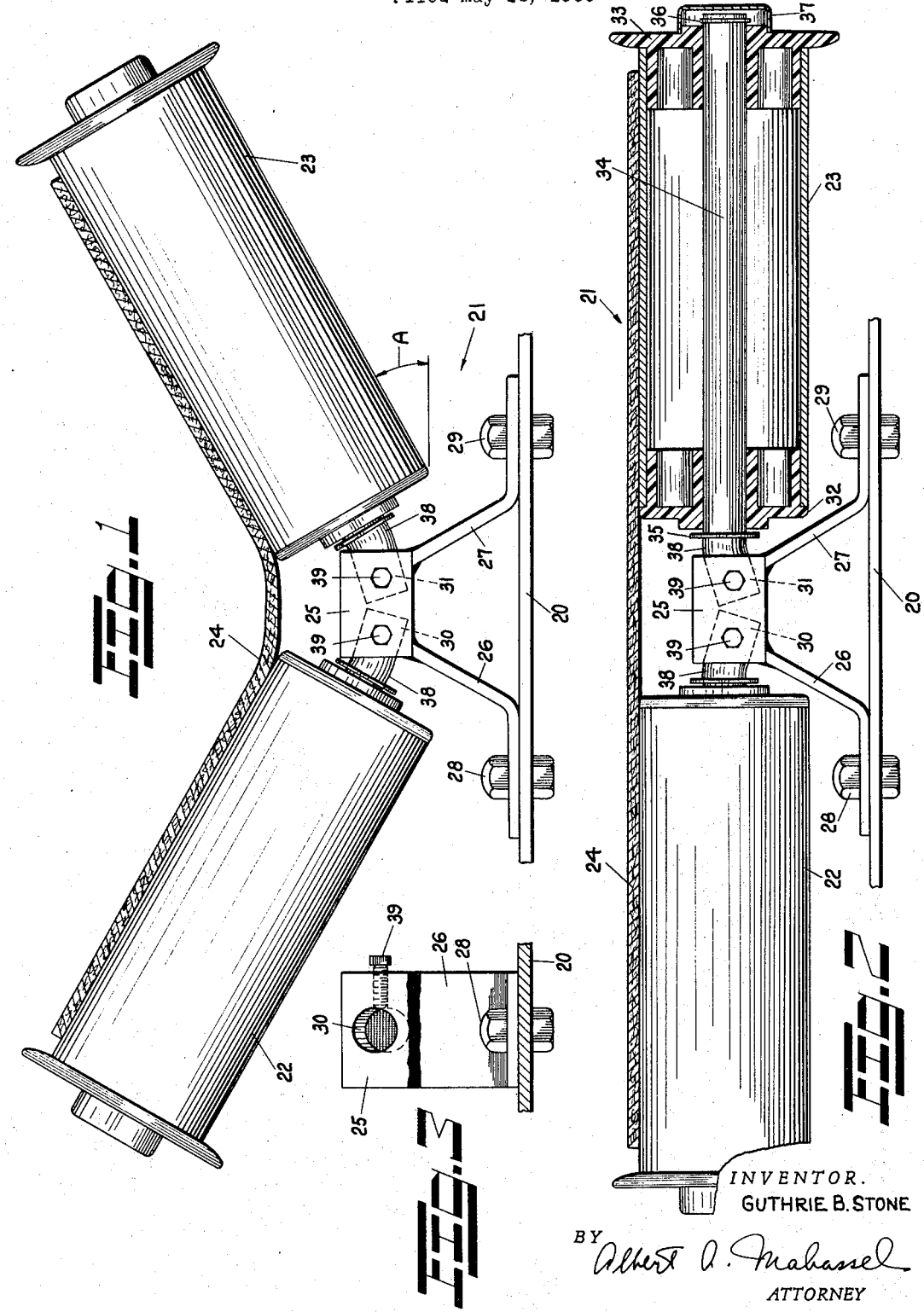

3,362,523
ADJUSTABLE BELT CARRIER FOR
ENDLESS CONVEYOR
Guthrie B. Stone, Honeoye, N.Y., assignor to Stone
Conveyor Company, Inc., Honeoye, N.Y.
Filed May 18, 1966, Ser. No. 551,007
2 Claims. (Cl. 198—192)

ABSTRACT OF THE DISCLOSURE

A mounting device for supporting conveyor rollers in a horizontal or angular relationship to present either a flat or trough-shape to the belt's carrying surface. One end of each roller shaft is bent at an angle equaling the inclination of the socket in which it is rotatably supported.

---

This invention pertains to roller mountings for endless belt type conveyors and, more particularly, to mountings with which the rollers may be transposed easily between flat-bed and trough-shaped belt support.

It is well known to form the upper or carrying surface of a belt conveyor in a V shape or as a trough to increase the capacity for loose materials. Numerous means have been presented for accomplishing this surface formation, as for example, supporting the outer or wing rolls of each linear series at their outside ends by framework attachments or by more complicated varied-height cantilever type supporting posts. In such known devices the changing over from one carrying surface to another has been either impossible or has been time consuming.

The present invention discloses a greatly simplified mounting for rollers whereby the mechanism may be set for one type of operation and later reverted to the other with very slight time delay and with little or no instruction.

It is a general object of the invention to provide an improved roller mounting by which rollers may be supported in either an upwardly directed angle or in a horizontal plane.

It is a further object of the invention to provide a roller mounting with which the supported rollers may be easily changed between raised and horizontal positions.

It is a further object to provide a mounting for conveyor rollers which shall be of simple design yet rugged and long-lasting in operation.

It is a still further object to provide a type of mounting which may be used between each two rolls in a series whereby the two outer rolls are inclined and the inner roll or rolls are horizontal.

These and other objects of the invention will become apparent as further details are disclosed in the specific embodiment thereof as illustrated in the accompanying figures of drawing wherein:

FIG. 1 shows the invention in elevation with the shafts and rolls fixed in the high position;

FIG. 2 is similar to FIG. 1 displaying the low or horizontal position; and

FIG. 3 is a side elevation of the shaft housing of FIGS. 1 and 2 with the shafts and rolls removed.

Now referring to the drawings, a transverse member 20 of a conveyor frame has a belt carrier series generally designated 21 laterally disposed thereon. The carrier series 21 is shown with two rolls 22 and 23 supporting the upper lap of an endless belt 24. A carrier series might contain more than two rolls for accommodation of a wider belt and greater conveying capacity as will be explained below. A solid mounting block 25 is welded to supporting legs 26 and 27 which are bolted at 28 and 29 to the member 20.

As was stated above, the general objective of this invention is to provide for supporting an endless belt as either a flat surface or in the form of a trough by inclining the outer rollers upwardly at a particular angle. The choice of angles is not critical and may range from a slight incline up to thirty or more degrees above a horizontal plane. For explanation purposes, an angle of 30° is chosen and will be called the trough angle and designated A in FIG. 1.

The block 25 has on both sides a downwardly inclined socket 30 and 31, cylindrical in shape. The axis of each socket should be at an angle above the horizontal plane equal to one-half that of the desired trough angle A, or in this instance, fifteen degrees.

The rolls 22 and 23 have end bearings 32 and 33 which may be of molded plastic formation as shown or any other suitable type of bearing which will allow free rotation upon the shafts 34. Locking rings 35 and 36 will hold the rolls in position upon the shaft 34 and a hub cap 37 may be snapped upon the outer end to keep out dirt or moisture.

Each shaft 34 has an end bend as at 38 for a close-fit insertion into the sockets 30 or 31. When held by the block 25 in the sockets 30 and 31, the shafts 34 will extend perpendicularly to the direction of travel of the belt 24. The end bend 38 is at an angle with the main length of shaft 34 which is equal to the angle of inclination of the sockets 30 and 31.

The shaft 34 is rotatable and fixedly positioned in a high position as shown in FIG. 1 and in a low position as shown in FIG. 2. Set screws 39 will lock the shaft 34 in either position and by merely loosening the set screws and moving the shaft 34 through a half-revolution the opposite position is easily attained. It will be noted the trough angle A in FIG. 1 equals the sum of the socket 31 angle and the end bend 38 angle, which in the embodiment herein is thirty degrees. To change the trough angle A, it is necessary only that the socket angle and the end bend be equal and that their sum be the desired number of degrees. In the low position the equal angles of the socket 31 and the end bend 38 offset each other and the shaft 34 will extend horizontally.

A wider application might use two or more mounting blocks 25, each supporting an end of two shafts with the central roll or rolls in a horizontal position and the two end rolls either horizontal or inclined.

A number of belt carrier series 21 as set forth herein may be spaced apart conveniently in fixed or portable conveyor frames and will provide positive support in either an angular or horizontal position.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:
1. Carrier series means for an endless belt of a conveyor mechanism which comprises
   (a) at least two rotatable belt-supporting rolls,
   (b) for each of said rolls a fixed shaft extending perpendicularly to the direction of movement of said belt,
   (c) a shaft mounting member secured to said mechanism and having two downwardly inclined cylindrical sockets,
   (d) one end of each said shaft being formed with a prescribed angle bend rotatably positionable within a said socket and providing a cantilever support for each said roll,

(e) the axis of each of said sockets being adapted to define an angle with the horizontal equal to said prescribed angle bend, whereby each of said shafts may be rotated between a high supporting position and a low supporting position, and (f) means for locking each said shaft in each of said positions.

2. Mechanism as defined in claim 1 wherein said mounting member includes a solid-block shaft housing being raised by supporting legs above said conveyor frame.

References Cited

UNITED STATES PATENTS

| 754,335 | 3/1904 | McCabe | 198—192 |
| 1,156,386 | 10/1915 | Armstrong | 198—192 |

FOREIGN PATENTS

| 528,662 | 6/1955 | Italy. |

RICHARD E. AEGERTER, *Primary Examiner.*

EVON C. BLUNK, *Examiner.*